Aug. 31, 1965     J. A. BARNES ETAL     3,203,198
PRESSURE EXCHANGER PLANT
Filed April 24, 1964

3,203,198
PRESSURE EXCHANGER PLANT
John Anthony Barnes, Wokingham, England, and Neil Milligan Clark, Belfast, Northern Ireland, assignors to Power Jets (Research & Development) Limited, London, England, a British company
Filed Apr. 24, 1964, Ser. No. 362,368
Claims priority, application Great Britain, May 8, 1963, 18,237/63
2 Claims. (Cl. 62—402)

This invention relates to pressure exchanger plant and particularly to plant the useful output of which is a stream of elastic fluid at a temperature below ambient temperature.

In mineworkings it is customary to provide a piped supply of compressed air for the operation of mine machinery. Under certain conditions, notably if methane is present in the mine air to an extent which would render the use of electricity undesirable, the compressed air is the only available power source. In mineworkings existing in tropical countries an added diffculty is the high ambient temperatures under which the miners are expected to work. Clearly there is a need for an apparatus which can produce locally, for example at a new working face a large mass flow of air at a temperature low enough to reduce the ambient air temperature appreciably and which can operate on compressed air.

A pressure exchanger as hereinafter referred to is defined as a machine comprising cells in which one elastic-fluid quantity expands in such a manner as to compress another elastic-fluid quantity with which it is in direct contact, ducting to lead elastic-fluid streams at different pressures substantially steadily to and from the cells and means to effect cyclic relative motion between the cells and the ducting. Customarily the cells are arranged in the form of a cell ring which rotates between end-plates having ports in communication with the ducting.

According to the present invention a pressure exchanger plant includes a turbo-charger and a pressure exchanger having low-pressure scavenging stage inlet and outlet ports, higher-pressure scavenging stage inlet and outlet ports and ducting connecting the higher-pressure scavenging stage outlet and inlet through a heat-exchanger, the outlet of the compressor of the turbo-charger being in communication with said ducting upstream of the heat-exchanger.

Preferably the outlet of the turbine of the turbo-charger is in communication with said ducting downstream of the heat-exchanger.

Figure 1:
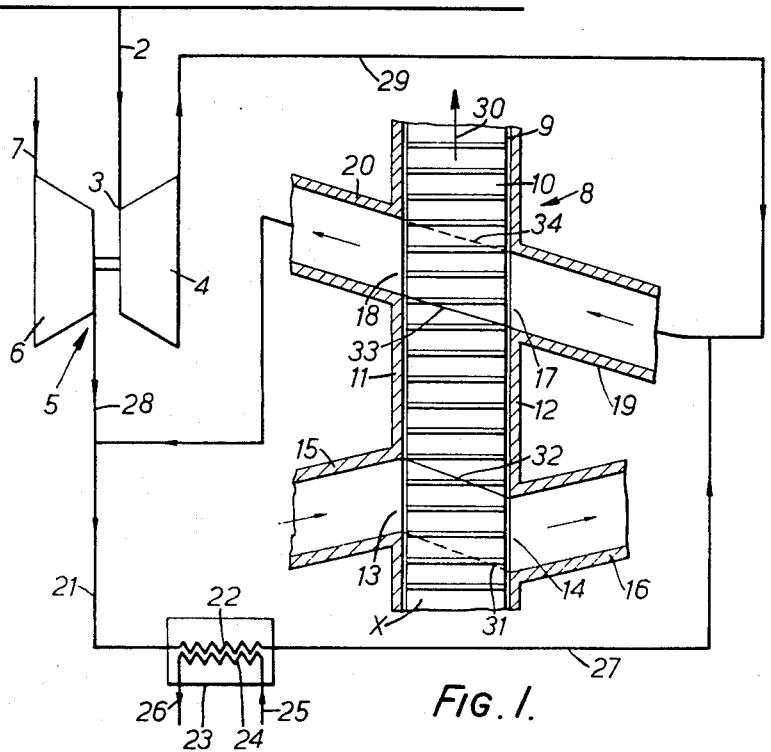
Figure 2:
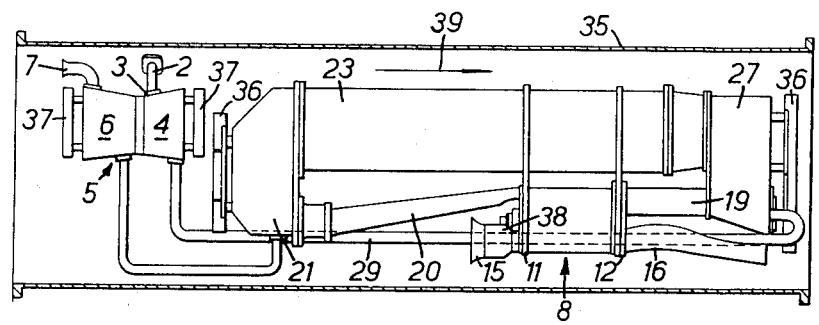

An embodiment of a pressure exchanger plant in accordance with the invention will now be described by way of example with reference to the accompanying diagrammatic drawing in which:

FIGURE 1 is a diagram of the plant in accordance with the invention, the pressure exchanger being shown as a developed view; and FIGURE 2 is a sectional side elevation of the plant of FIGURE 1 illustrating diagrammatically the layout of the plant.

Referring to FIGURE 1 of the drawing, the pressure exchanger plant shown provides a useful output in the form of a stream of elastic fluid at a temperature below ambient temperature. The plant is particularly suitable for use at new working faces of mineworkings. A compressed air line 1 has a branch 2 which leads to the inlet 3 of the turbine 4 of a turbo-charger combination denoted generally by the reference 5. The turbine 4 is direct coupled in practice (a short shaft being shown only to indicate a coupling) to a compressor 6 the intake of which is indicated at 7.

A pressure exchanger denoted generally by the reference 8 has a cell ring 9 including a plurality of cells 10. The cell ring 9 is journalled for rotation, in a direction indicated by the arrow 30, between end-plates 11, 12 each of which has ports through which elastic fluid, in the present instance air, can pass to and from the cells. A low-pressure scavenging stage includes an inlet port 13 in the end-plate 11, an outlet port 14 in the end-plate 12 and cells at any time in communication with one or both of these ports. The inlet port 13 forms the termination of an inlet duct 15 and the outlet port 14 communicates with an outlet duct 16, which serves to convey the useful output of cool air to a region where it is required.

A high-pressure scavenging stage includes an inlet port 17 in the end-plate 12, an outlet port 18 in the end-plate 11 and cells at any time in communication with one or both of these ports. The inlet port 17 forms the termination of an inlet duct 19 and the outlet port 18 communicates with an outlet duct 20. From the drawing it will be seen that the inlet and outlet ports are so disposed relatively to the cells that air entering and leaving the cells will have a component of motion in the direction of rotation of the cell ring.

The outlet duct 20 communicates with ducting 21 which in turn communicates with the hot pass 22 of a heat-exchanger 23. The cold pass 24 of the heat-exchanger 23 has an inlet 25 and an outlet 26. The outlet of the hot pass 22 communicates with ducting 27 which leads to the high-pressure scavenging stage inlet duct 19. The outlet of the compressor 6 communicates through a duct 28 with the ducting 21 upstream of the heat-exchanger 23 and the exhaust outlet of the turbine 4 communicates through a duct 29 with the ducting 27 downstream of the heat-exchanger 23.

The operation of the plant will now be described. The turbine 4 is driven by compressed air derived from the line 1 through the branch 2. The turbine exhaust air, at a lower temperature owing to the expansion process, passes to the higher-pressure scavenging stage inlet duct 19 through the duct 29. Air drawn into the compressor 6 through the inlet 7 is compressed and passes, at a higher temperature owing to the compression process, to the ducting 21 through the duct 28. Compressed air is also derived from the outlet duct 20 of the pressure exchanger and both streams combine and pass to the hot pass 22 of the heat-exchanger 23 where cooling takes place before the air passes through the ducting 27 to the higher-pressure scavenging stage inlet duct 19.

The operation of the pressure exchanger 8 will now be described, the cycle of operation being considered for a single cell initially assumed to be at the position X and travelling in the direction indicated by the arrow 30. Every cell undergoes an identical cycle of operation. The cell under consideration contains air slightly above atmospheric pressure but at a temperature below ambient temperature, the air having been introduced in a manner to be described hereinafter.

On reaching the opening edge of the low-pressure scavenging stage outlet port 14 the difference between the pressure in the cell and in the port gives rise to flow outwards from the cell to the port 14 and the duct 16 and this flow continues until the closing edge of the port is reached. The arrival of the cell under consideration at the opening edge also gives rise, in the cell, to an expansion wave fan which travels along a path, indicated by a single broken line 31, joining the opening edges of the ports 14 and 13. The cell, as the cell ring continues to rotate, next encounters the opening edge of the inlet port 13 and because the pressure in the cell has been reduced to a subatmospheric pressure by the expansion wave fan of path 31, air at atmospheric pressure enters the cell though the inlet duct 15 and inlet port 13 and continues to flow in until the closing edge of the port is reached. In the meanwhile, the closing edge of the port 14 is reached by the cell and the fresh air drawn in through the port 13 is brought to a standstill, thereby setting up a compression wave which travels along a path, indicated by a single full line 32, joining the closing edges of the ports 14 and 13. After the cell has passed the closing edge of the port 13 the contents are substantially at rest and at a pressure slightly above atmospheric pressure. As the cell ring continues to rotate the cell next encounters the opening edge of the higher-pressure scavenging stage inlet port 17. At this point the air in the cell at a pressure slightly above atmospheric comes into contact with compressed air delivered to the inlet port 17 from the turbocharger 5 through the ducts described. A compression wave is generated by the compressed air and this wave compresses the air already in the cell and sets it in motion towards the higher-pressure scavenging stage outlet port 18. The compression wave travels along a path, indicated by a full line 33, joining the opening edges of the ports 17 and 18.

At the instant when the newly compressed air reaches the end of the cell opposite that of the inlet port 17 the opening edge of the outlet port 18 is encountered by the cell and the air flows out through the port 18 to the duct 20. Compressed air continues to leave the cell until it encounters the closing edge of the port 18. In the meanwhile, the cell has passed the closing edge of the inlet port 17 and the effective cutting-off of the compressed air supply has generated an expansion wave fan which travels along a path, indicated by a single broken line 34, joining the closing edges of the ports 17 and 18. The compressed air which enters through the port 17 is relatively cool because of passage through the heat-exchanger 23 of one part and expansion in the turbine 4 of the other part of the total flow. The expansion wave fan of path 34 results in further cooling and as described above the cell initially considered at the position X contains cool air at a pressure slightly abve atmospheric. The useful output is further cooled by the expansion wave fan of path 31 before it leaves through the port 14 and the duct 16 of the low-pressure scavenging stage.

In the above description of operation reference has been made to compression and expansion waves and the paths of these have been indicated by single full and broken lines respectively. It will be appreciated that these lines are only an approximately to the actual wave path in the cells and furthermore that even these approximations hold good only for the designed operating conditions (cell ring speed, pressure ratio, temperature and the like). However, the compression and expansion waves do serve to determine, for the low-pressure scavenging stage the position of the opening edge of the inlet port 13 relative to the arbitrarily positioned opening edge of the outlet port 14 and the position of the closing edge of the inlet port 13, relative to the closing of the outlet port 14, the closing edge of the port 14 being determined by the requirement that the port should be of sufficient peripheral width to ensure proper scavenging. Similar considerations apply to the positioning of the opening and closing edges of the ports of the higher-pressure scavenging stage.

FIGURE 2 shows a layout of the plant shown in FIGURE 1 which accords with the actual physical layout. Similar parts have been given the same reference numerals as in FIGURE 1. The cooling plant is mounted within a ventilating shaft 35 the heat-exchanger and pressure exchanger assembly being mounted on brackets 36 and the turbo-charger being mounted on brackets 37. The branch 2 of the compressed air line 1 (not shown in this figure) passes through the wall of the duct 35. The only other part not shown in FIGURE 1 is a debris guard 38 following the low-pressure inlet duct 15. The direction of flow through the ventilating duct is indicated by an arrow 39. The plant, as a whole, although extending generally in a direction parallel to the longitudinal axis of the ventilating duct, is off-set to one side of the axis to simplify the mounting arrangement.

We claim:
1. A pressure exchanger plant including a turbocharger comprising a compressor and a turbine each having an inlet and an outlet, a pressure exchanger having low-pressure scavenging stage inlet and outlet ports and higher-pressure scavenging stage inlet and outlet ports, a heat-exchanger and ducting connecting the higher-pressure scavenging stage outlet and inlet ports of the pressure exchanger through the heat exchanger, the outlet of the compressor being in communication with said ducting upstream of the heat-exchanger.

2. A pressure exchanger plant according to claim 1, wherein the outlet of the turbine is in communication with said ducting downstream of the heat-exchanger.

References Cited by the Examiner
UNITED STATES PATENTS 2,952,982 9/60 Spalding _____ 62—401
3,106,073 10/63 Kentfield _____ 62—86

WILLIAM J. WYE, *Primary Examiner.*